Feb. 25, 1969   J. F. NUNES, JR   3,429,377
SOD HARVESTING APPARATUS
Filed March 5, 1965

INVENTOR.
John F. Nunes, Jr.
BY
Attorneys

United States Patent Office  
3,429,377  
Patented Feb. 25, 1969

3,429,377  
SOD HARVESTING APPARATUS  
John F. Nunes, Jr., Rte. 1, Box 166,  
Patterson, Calif. 95363  
Filed Mar. 5, 1965, Ser. No. 437,511  
U.S. Cl. 172—19         17 Claims  
Int. Cl. A01b 45/04

ABSTRACT OF THE DISCLOSURE

A sod harvesting apparatus for mobilized pick-up of pre-cut sod lying in a field includes a ramp for engaging the underside of the sod and for moving the sod upwardly onto a conveyor. The conveyor draws the sod upwardly therealong to a roll forming station. The roll forming station tightly compacts the roll of sod and then detects the end of the roll whereupon the roll forming station ejects the roll rearwardly to the ground. The roll of sod is of opposite hand to the rotational movement of the wheels of the vehicle whereby the sod will not become unrolled on the ground. Additional means serve to preclude unrolling of the sod as it hits the ground. The pick-up ramp is guided by registering against the exposed edge of the next adjacent line of sod.

---

This invention relates to agricultural implements and more particularly to sod harvesting apparatus.

In the past various attempts have been made to provide apparatus for harvesting sod with limited success. In the commercial growing of sod it is necessary to roll each predetermined length of sod into a tight roll in order to preserve its condition.

Previous attempts to mechanize this function have been sufficiently unsuccessful that, generally, sod is rolled by hand. Other problems encountered in regard to mechanical rolling of sod have involved suitable detection of the completion of the rolling of a given length of sod, as well as problems relating to the unrolling of the sod upon its delivery from the mechanical rolling apparatus.

In general, it is an object of the present invention to provide an improved sod rolling apparatus.

It is another object of the invention to provide sod rolling apparatus whereby a tight roll of sod is prepared.

A further object of the invention is the provision of mechanical sod rolling apparatus whereby a roll of sod, after it has been tightly rolled, is not subject to becoming unrolled upon delivery of the roll from the equipment.

Yet another object of the invention is the provision of mechanical sod rolling apparatus having improved sod handling and control means.

These and other objects of the invention will be more clearly apparent from the following detailed description of a preferred embodiment when considered in conjunction with the following drawings, in which.

The general arrangement of sod harvesting apparatus, as will be described in greater detail further below, includes a supporting framework arranged to move across a field of sod to be harvested. Mechanism is provided for engaging and conveying sod upwardly and rearwardly of the framework to a roll-forming station. A roll forming assembly is disposed at the roll forming station to tightly roll a predetermined length of sod into a compact roll. Upon completion of the roll, the sod is delivered from the roll-forming station. Means are provided to sense the substantial completion of the formation of each roll of sod so as to advance the sod from the roll-forming station. Means are provided to substantially arrest any rearward relative movement of the rolls upon their delivery to the ground which otherwise would tend to unroll the sod.

With reference to the drawings a wheel supported vehicular framework or chassis is formed by a pair of spaced parallel side members 11, 12. The ends of members 11, 12 are joined by a pair of transverse channel members 13, 14. A steering arm 16 is arranged to steer a pair of guide wheels 17 carried in a steering yoke 18 beneath the forward end of the vehicle.

Substantially two-thirds of the distance to the rear of frame members 11, 12, a pair of laterally spaced drums 19 form the rear wheels of the vehicle and are mounted for rotation about an axle 21 which is carried in downwardly depending journal members 22.

Figure 4:
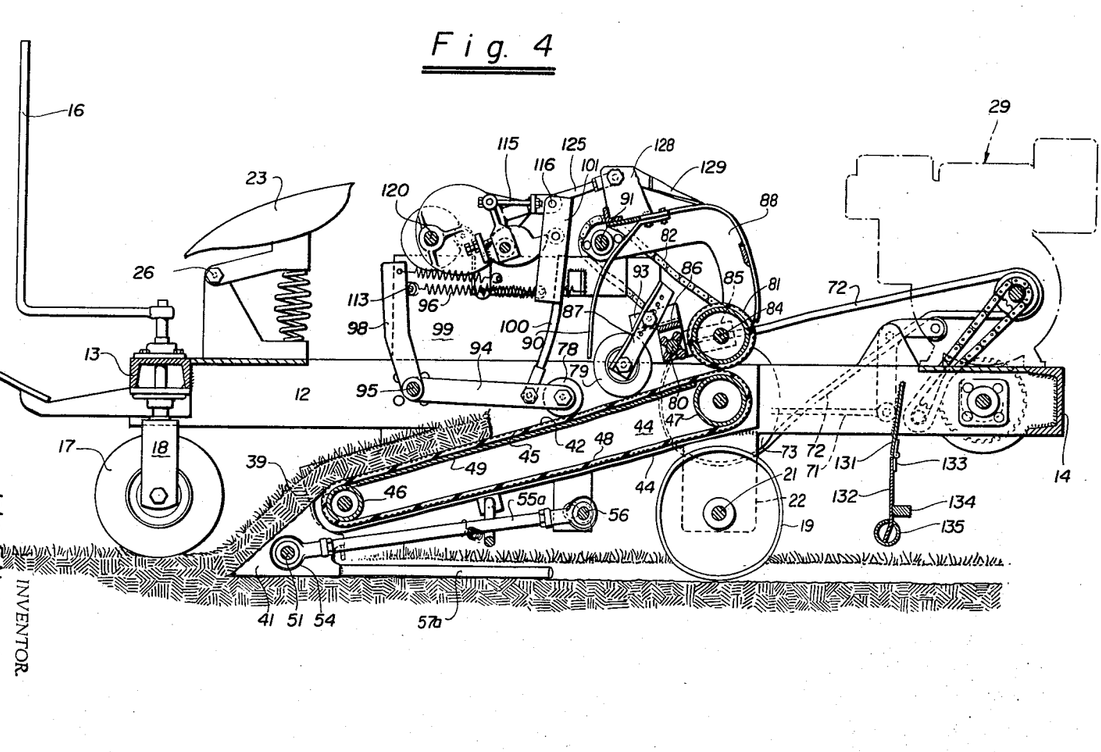
FIGURE 4 is an enlarged elevation section view taken along the line 4—4 of FIGURE 2.

An operator's station is provided at the forward end of the vehicle and includes a seat 23 supported upon a helical spring 24 pivoted about point 26 and a pair of foot rests. A suitable engine 29 is carried at the rear of side members 11, 12. Engine 29 includes a power take-off 32 at one end of its drive shaft for driving the vehicle. The drive train leading to the rear wheels (drums 19) includes a link belt 30 trained about an idler gear whereby one reach of belt 30 engages a spur gear 25 secured on the shaft 66 (FIGURE 4). To drive the rear wheels 19, a pulley 31 is carried on the end of shaft 66, and serves to drive a belt 33 running to another pulley 34.

Belt 33 is friction clutched to provide forward movement to the vehicle by means of a connecting rod 35 connected at one end to be operated by a hand lever 27 and at the other, to pivotally operate a belt engaging crank 36 having a pressure roller at one end in contact with belt 33. Therefore, forward depression of lever 27 serves to cause belt 33 to move the harvesting apparatus across a field of sod to be harvested.

In the commercial production of sod a preferred practice entails use of a horizontally acting sod cutter apparatus (not shown) whereby the sod roots are severed at a predetermined depth below the foliage. In addition, as the sod lies in place in the field, it is cut into predetermined lengths. A typical slab of sod may run on the order of five feet in length and one foot in width. However, other lengths and widths are sometimes employed.

Thus, after it is cut, the sod will lie in a number of adjacent rows each divided into a number of short lengths ready to be picked up and rolled. The rear wheels 19 follow in the path of the sod being picked up and extend sufficiently downwardly from frame members 11, 12 whereby a level attitude is maintained.

Means serving to pick up and roll a length of sod 39 includes a short incline or ramp means defined by a plurality of wedge shaped spaced tines 41 arranged to direct sod 39 onto the upper run or reach 42 of an endless belt conveyor assembly 43. Conveyor assembly 43 includes a pair of spaced parallel side plates 44 secured to side members 11, 12 respectively. Assembly 43 includes a suitable cyclically driven endless belt 45 trained about a pair of guide rollers 46, 47 mounted for rotation to cause the upper reach 42 of belt 45 to be inclined to move upwardly and rearwardly of the vehicle. The lower reach 48 moves downwardly and forwardly. The upper reach 42 is supported from beneath by a load receiving plate 49.

A sod engaging ramp assembly 40 is provided for initially picking up the sod and directing it upwardly onto conveyor assembly 43. A "ramp" is defined by the upper edges of tines 41. The upper edges of tines 41 terminate in closely spaced relation to the upper reach 42 of belt 45. Each tine 41 is fixed to a rod 51 and disposed in laterally spaced relation whereby their projecting tips define the leading edge of the ramp means. This leading edge is shown in the drawings by the reference line 52.

"Edge" 52 is supported whereby it can rise and fall, as well as tilt, in an upright plane extending transversely to the direction of vehicle movement and thereby follow the contour of the ground bared in the path of the sod being picked up. The leading edge 52 is positively reciprocated to advance and retreat as the harvesting apparatus moves across the field and also is supported for lateral swinging movement transversely of the path of sod being harvested. Resilient means cooperate with the lateral swinging movement to cause the ramp means to be guided by the exposed edge of an adjacent line of sod and relieve the driver of the need to stringently guide the vehicle.

The foregoing mounting arrangement has a number of advantages as will become evident from the following detailed description of this portion of the apparatus.

A quadrilateral carriage to support the ramp is defined by a plurality of members. One side of the quadrilateral is mounted to revolve in an annular path about an axis spaced from its own axis. Means are provided to couple each adjacent pair of the four sides of the quadrilateral for universal movement with respect to each other. The side opposite to the revolving side includes the ramp means and thus the ramp is reciprocated to advance and retreat.

Thus, the ends of rod 51 are formed with a truncated spherical portion 53 engaged in a coacting annular socket 54 formed with a bearing race (not shown) whereby the ends of rod 51 articulate with a universal movement with respect to the forwardly extending support rods 55a, 55b. The other ends of support rods 55a, 55b are supported upon a transversely extending tie rod 56 by means similar to the ball and socket 53, 54 whereby each rod 55 is permitted universal movement at each end. Thus, the ramp means is supported whereby the leading edge 52 can rise and fall as well as tilt in an upright plane and also can swing laterally from side to side, as shown for example to a position illustrated in the phantom line portion of FIGURE 9.

Means are provided serving to register the side of the ramp means to be guided by the exposed edge of the next adjacent line of sod. The endmost pair of tines 41 at each end of the ramp are strengthened by a stud-like brace member (FIGURE 9) and the outermost tines are formed to trail a registration rod 57a, 57b.

Figure 9:
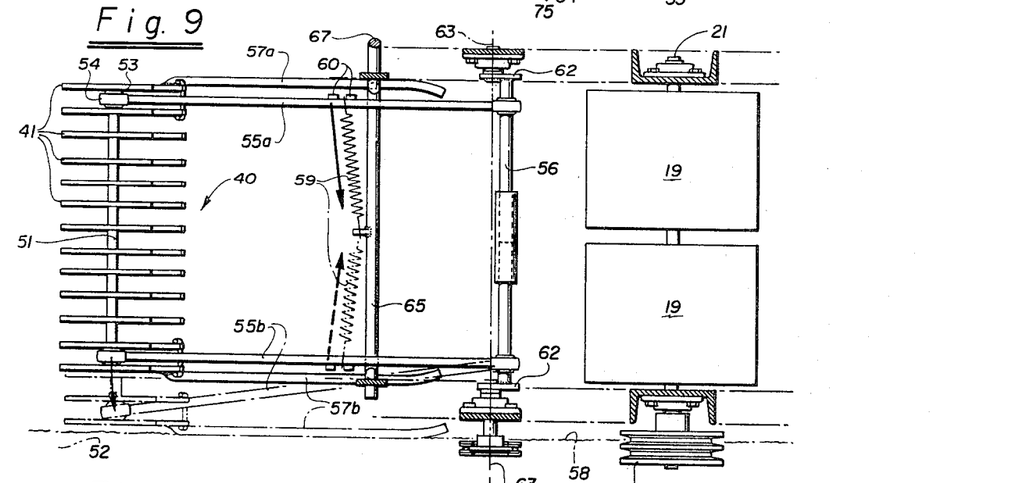
FIGURE 9 is a plan view in section taken along line 9—9 of FIGURE 1.
Figure 10:
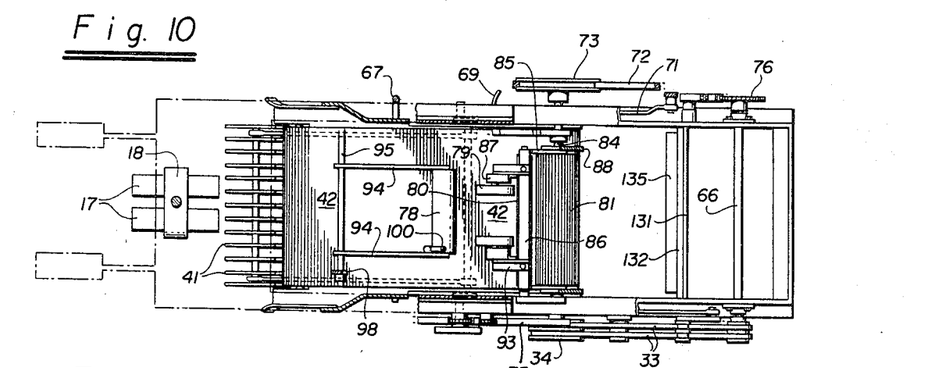
FIGURE 10 is a plan view in section taken along line 10—10 of FIGURE 1.

Resilient means are provided for selectively urging rods 57a, 57b either to the left or to the right depending upon whether the exposed edge of sod is adjacent to the left or right side of the path of sod being harvested. It will, therefore, be appreciated that as the apparatus proceeds in one direction across a field, the registration rods will be arranged to be urged to the left to bear against the exposed edge 58 (FIGURE 9). During the return pass across the field, the resilient means cooperates with ramp assembly 40 so that it will be urged to the right.

Thus a spring 59 (shown in full lines in FIGURE 9 in its position to urge the ramp assembly 40 to be guided by the edge 58, and shown in phantom lines for urging the ramp assembly in the opposite direction) is removably disposed whereby after each pass across the field it can be switched over to achieve the foregoing objective.

Coil spring 59 is provided with a hook portion at each end whereby one end can engage a notch formed between a pair of protrusions 60 formed on the side of support rods 55. The other end of spring 59 is removably engageable with an inverted J-shaped slot formed in a pair of downwardly projecting spring anchor plates 61 (FIGURE 4). The J slots in anchor plates 61 provide a protrusion adapted to engage the hooked end of the coil spring 59 so as to be readily disengageable at each end whereby after each pass across a field the coil spring 59 can be shifted.

Figure 1:
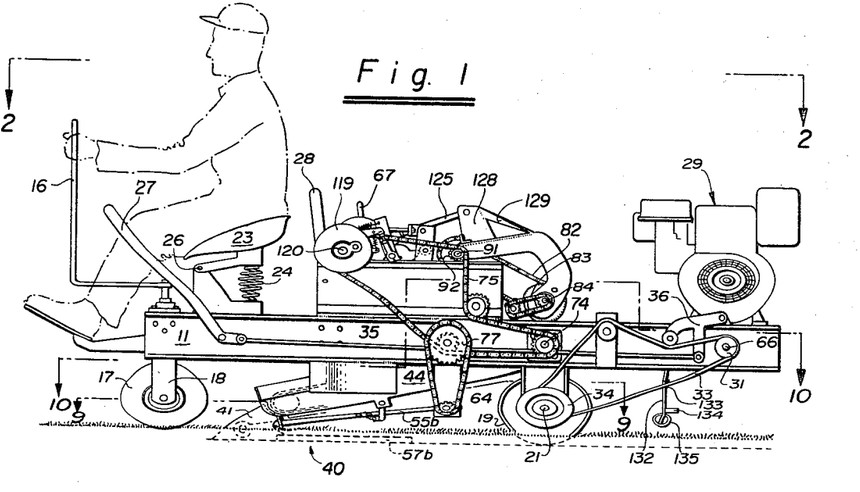
FIGURE 1 is a left side view of sod harvesting apparatus according to the present invention.

Means are provided to reciprocate tie rod 56 to cause ramp assembly 40 to advance and retreat as the vehicle moves across a field. Thus rod 56 is eccentrically mounted by means of a crank 62 at each end. Cranks 62 are arranged to be rotated about axis 63. As shown in FIGURE 1 a sprocket 64 serves to rotate cranks 62 to eccentrically drive rod 56. The remainder of the drive train to cranks 62 is explained further below.

The reciprocating movement of the ramp during harvesting serves to prevent the sod from "balling up" upon initial engagement with the apparatus. Furthermore, the leading edge 52 of the ramp follows rather closely behind the vehicle wheels 17 which serve somewhat to loosen the pre-cut sod and further permit a smooth raising of the sod by the ramp means. Accordingly, wheels 17 serve to press downwardly slightly upon the sod and, due to their circular configuration, the sod has a tendency to curl up slightly to the rear. In this manner, wheels 17 provide a modest loosening of the sod to further aid in enhancing engagement of the sod by the tines.

While it was previously noted that the leading edge 52 is free to rise and fall in an upright plane transversely of the path of the sod being picked up, the rise and fall is contained within closely controlled limits thereby serving to protect the sod by insuring against any upward excursion of the tines 41 which would slice through the sod from below. On the other hand, by limiting the degree to which the tines may drop beneath the vehicle, any tendency for the tines 41 to dig into the ground at a progressively steepening downward angle is inhibited.

Figure 3:
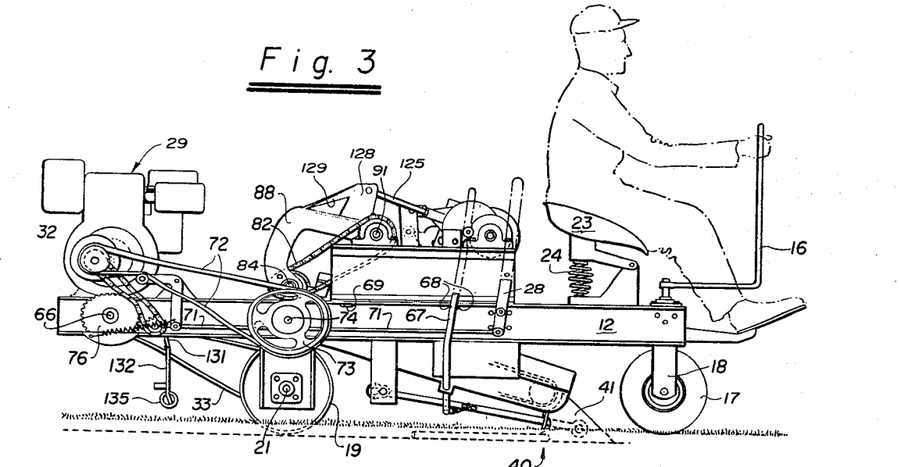
FIGURE 3 is a right side view of sod harvesting apparatus shown in FIGURE 1, taken along the line 3—3 of FIGURE 2.

Thus, means are provided which serve to define the upper and lower limit of travel of the ramp assembly 40. The degree to which ramp assembly 40 can drop beneath the vehicle is limited by a rod 65 of generally U-shaped configuration which is disposed to extend transversely of the apparatus in a position immediately beneath support rods 55. The ends of limit rod 65 are journaled at each side of conveyor assembly 43 in plates 61. One end of limit rod 65 is provided with an extension in the form of a lever 67 (FIGURE 3). Lever 67 is held firmly in a predetermined position by means of a pair of pins 68 forming a retaining channel.

Lever 67 serves to provide manual means for raising ramp assembly 40 upwardly out of engagement with the ground beneath the harvesting apparatus during periods when harvesting is not being conducted. Thus lever 67 can be slightly bent laterally out of the channel formed by pins 68 and then rocked rearwardly and locked between pins 69. The upper limit of travel for assembly 40 is defined when the arcuate rear portion of tines 41 engage the leading edge of conveyor assembly 43.

From the foregoing it will be understood that during forward movement of the harvesting apparatus across a field of sod, tines 41 engage and lift each predetermined length of sod 39 onto the upper reach 42 of the endless belt conveyor assembly 43.

Means are provided to operate endless belt 45 whereby the upper run proceeds at a speed rearwardly sufficiently greater than the forward speed of the frame (with respect to the ground) to provide a resultant conveyor speed acting rearwardly with respect to the ground so as to apply a pull to the sod entering upon the conveyor. Thus, the sod is picked up by vehicle movement and handled in tension by the conveyor.

Movement of the vehicle is under control of lever 27 as previously noted. Operation of the conveyor assembly is under control of another lever 28 whereby connecting rod 71 serves to rock a bell crank and tension the drive belt 72. Drive belt 72 is trained between power take-off 32 and a drive pulley 73. Pulley 73 drives a shaft 74 serving to move the upper reach 42 of the conveyor upwardly and rearwardly.

In order to cause the conveyor belt 45 to move at a speed which produces a resultant speed differential acting rearwardly of the vehicle relative to its movement over the ground, power take-off 32 includes an additional drive pulley 76 serving to operate shaft 66 extending transversely between side frame members 11, 12 and coupled to rotate pulley 31 to drive belt 33 about pulley 34.

Thus, it can be seen that power for the forward movement of the vehicle is applied from power take-off 32 as is the drive of the conveyor means (via shaft 74). Accordingly, the pulley relationships are such that the upper run of the conveyor moves with a resultant speed differential serving to apply a modest tensioning or "pull" to sod 39 being handled. Shaft 74 also serves to power the reciprocating movement of assembly 40. A chain belt 75 is trained to drive the sprocketed reduction gears 77 whereby another chain belt can drive gear 64.

A roll-forming station is disposed at the upper end of the conveyor assembly. Roll forming means are disposed at the roll forming station and serve to curl a predetermined length of sod tightly into a roll. The roll forming means engages the sod and curls it backwardly and tightly tucks its leading edge to initiate the roll. The roll forming means further serves to apply, to the roll being formed, restraint acting against expansion thereof during progressive enlargement of the periphery of the roll.

More particularly, the restraint is applied to the roll over a progressively increasing arcuate extent of the periphery by means now to be described.

As the leading edge of each slab of sod 39 proceeds upwardly on conveyor belt 45, a trip roller 78, described further below, is pushed upwardly to ride along the foliage surface of the sod. The leading edge of the sod next strikes a pair of restraining rollers 79, passes beneath a tuck roller 80, and finally engages a curling roller 81. Tuck roller 80 includes a "corduroy" periphery formed of rods welded to a cylindrical core to provide a plurality of ridges and valleys, alternately occurring, and extending axially along the roll whereby leading end of the sod is positively engaged and tightly tucked. Curling roller 81 extends transversely of the conveyor and is driven by a chain belt 82 moving to rotate roller 81 against the direction of movement of the oncoming sod on the conveyor.

Tuck roller 80 is arranged across the path of the sod which is to be rolled and is mounted for free arcuate movement upwardly about an axis defined by the axle 84 of curling roller 81. Thus, at each end of tuck roller 80, a pivot arm 85 is journaled to swing upwardly about axle 84. The two arms 85 are joined together by a transversely extending flat bar 86. Bar 86 carries a pair of forwardly directed extension arms 93, each supporting an associated bracket 87. Each bracket 87 carries an associated one of the two restraining rollers 79. The ends of tuck roller are journaled in pivot arms 85.

As curling roller 81 engages the sod, it curls the sod backwardly for forming a roll. Curling roller 81 is disposed so as to feed the sod against tuck roller 80. Tuck roller 80 is positively driven by chain belt 83 in a manner whereby tuck roller 80 also rotates against the direction of movement of the oncoming sod and thereby serves to direct the leading edge of the sod backwardly against the foliage side of the sod and commence the formation of the roll with a tight initial convolution.

The restraining rollers 79 are adjustably positionable to vary the spaced relation between their axes and tuck roller 80. Accordingly, each bracket 87 is formed with a series of holes whereby a bolt can adjustably fix the bracket 87 to its extension arm 93. As noted above the length of the slabs of sod can vary and for the longer lengths a larger roll will be formed. For such larger rolls the axis of rollers 79 will be spaced farther from the axis of tuck roller 80 and for smaller rolls will be moved closer.

The roll forming means includes a sub-framework including a pair of laterally spaced J-shaped members 88 joined at their upper ends by a transversely extending frame portion 89. At their lower ends an axle 84 supports curling roller 81 for rotation therewith. Axle 84 is driven by chain 82 trained between a pair of sprocket wheels. Lever arms 85 serve to pivotally support both the tuck roller 80 and the restraining rollers 79 for pivotal movement about axle 84.

The sub-frame formed generally by J-members 88 further includes a downwardly depending resilient arcuate leaf-mounted deflector member 90 disposed forwardly of curling roller 81. The weight of tuck roller 80 and rollers 79 applies a restraining pressure to the sod continuously during formation of each roll.

Chain belt 82, to drive curling roller 81, receives power from a shaft 91 extending transversely of the apparatus. Shaft 91 carries a sprocket wheel 92 at the left end thereof. Sprocket wheel 92 is driven by belt 75 powered by rotation of axle 74. Axle 74 receives its power from belt 72 coupled to power take-off 32.

Thus, it can be seen that rotation of belt 72 drives axle 74 to cause conveyor belt 45 to feed sod upwardly on the upper run thereof. At the same time operation of axle 74 also serves to drive sprocket 92 which rotates the shaft 91 thereby driving curling roller 81 against the oncoming sod. This engagement then serves to cause the sod to fold or double back upon itself and to be directed against the "corduroy" surface of tuck roller 80 so as to initiate and tightly form the first convolution of a roll of sod.

Tuck roller 80 yieldingly moves upwardly as the sod roll enlarges. In addition, a restraining pressure is applied by weight-loading of the growing sod roll over a progressively increasing arcuate extent of its periphery. Thus, the dirt side of the sod roll subsequently engages the additional rollers 79. The roll continues, however, to grow and ultimately the dirt side of the rolled sod is engaged by the leaf-mounted deflector member 90 at a region of the sod even further arcuately spaced from the foregoing points of contact. Member 90 serves to yieldingly resist expansion of the roll during the later stages of its formation.

Deflector member 90 is arranged to be movable between retracted and advanced positions with the sub-frame formed by J members 88 so as to boost the roll of sod out of the rolling station, as will be more fully explained further below.

Operation of the apparatus up to this point provides the formation of a tightly rolled predetermined length of sod.

Means are provided which serve to detect the completion of the rolling of each length of sod as will now be described with particular reference to the apparatus shown in FIGURE 5.

Trip roller 78 is supported for rotation at the ends of a pair of lever arms 94 carried on a pivot rod 95 extending between side frame members 11, 12 of the vehicle. Lever arms 94 and trip roller 78 are urged downwardly against the upper reach 42 of conveyor belt 45 by means of a biasing spring 96. Spring 96 extends between a fixed rod 97 and a crank arm 98. As shown best in FIGURE 4 a pair of upwardly extending side panel plates 99 form a rigid frame for the mounting of a trip and catch linkage serving to detect the end of a predetermined length of sod being rolled. Trip roller 78 is disposed closely adjacent the roll forming station whereby the roll is substantially completely formed at a time when trip roller 78 rolls off the trailing edge of each length of sod being formed. As noted above, the sod is conveyed faster than it is urged upwardly onto tines 41, i.e. the speed of advance of the conveyed sod is greater than vehicular speed and this serves to separate each length of sod.

A trip and catch linkage serving to activate the discharge of a roll includes an upwardly extending connecting rod 100 pivotally mounted at its lower end to one of lever arms 94. The upper end of connecting rod 100 is fixed between a pair of plates 101. Plates 101 carry a catch roller 102 mounted for rotation on a short shaft extending between plates 101. Upon upward movement of trip roller 78, connecting rod 100 serves to raise catch roller 102 upwardly over the lip forming a tooth 104 on a helical cam member 105. Rod 100 is urged toward tooth 104 by spring 103 fastened to a fixed rod 113. Thus, catch roller 102 is free to "float" up and down on tooth 104 as trip roller 78 moves along the irregular foliage surface of the sod.

Figure 5:
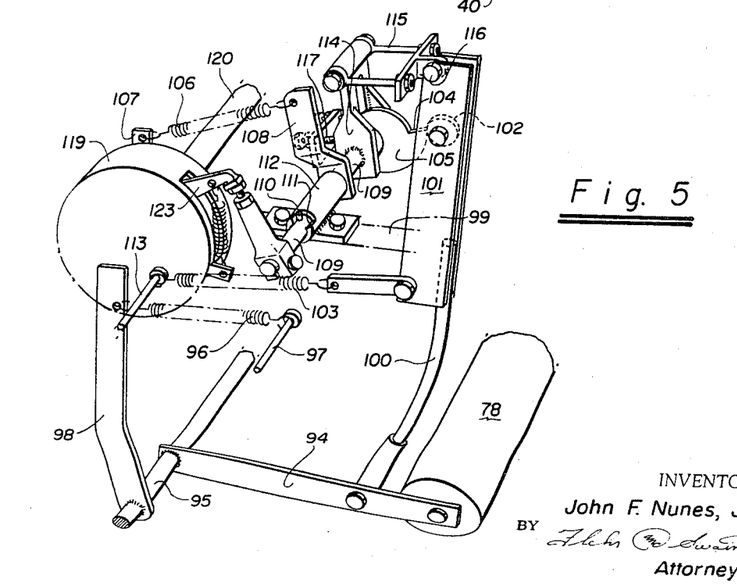
FIGURE 5 is an enlarged detail view, in perspective, showing a trip mechanism serving to sense the completion of rolling a predetermined length of sod.
Figure 6:
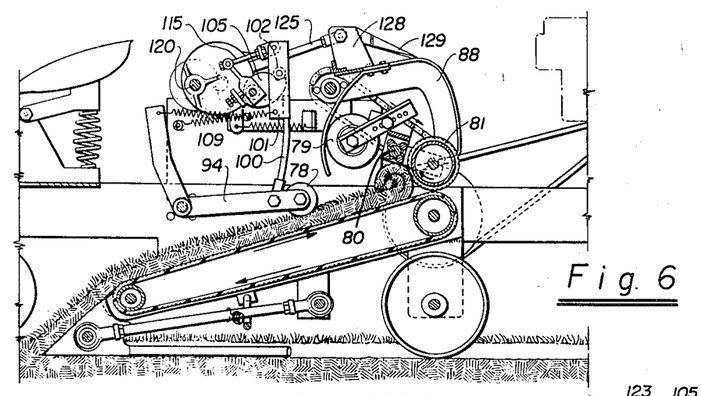
FIGURES 6, 7 and 8 are side elevation partial views along the line 4—4 of FIGURE 2, and when considered with FIGURE 4 show a sequence of movements of the apparatus harvesting a predetermined length of sod into a roll thereof.
Figures 7, 7A, 7B:
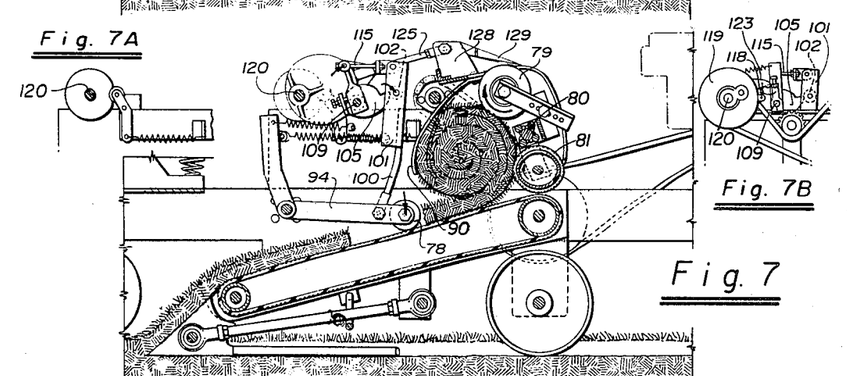
FIGURE 7A is a detail view of a hidden portion in FIGURE 7 showing its condition at a time corresponding to that represented in FIGURE 7.
FIGURE 7B is a detail view of a portion of the apparatus otherwise removed from the view shown in FIGURE 7 showing the condition thereof temporally related to the condition of the structure in FIGURE 7.

Cam member 105 is urged counter-clockwise as shown in FIGURE 5 by means of the spring 106 connected between a bracket 107 fixed with respect to plate 99. The other end of spring 106 is connected to a lever arm 108 secured to a trip shaft 109. Trip shaft 109 is urged counter-clockwise in FIGUE 5 by spring 106 to a predetermined disposition defined by a limit pin 110. Pin 110 is mounted for rotation through a predetermined arc defined by a notch 111 formed in the end of a sleeve bearing 112. Sleeve bearing 112 is carried in fixed relation to plate 99.

Arcuate movement of trip shaft 109 serves to rotate a bifurcated lever member 114. Lever member 114 carries a link 115 pivotally at its upper end. Link 115 extends to be coupled to the upper end of plates 101 by means of a pivot pin 116. Counter-clockwise movement of lever member 114 is limited by the adjustment stops 117.

Trip roller 78 drops downwardly after passage of the trailing edge of each predetermined length of sod. Connecting rod 100 will then be pulled downwardly serving to rotate trip shaft 109. At the same time, however, link 115, coupled to the upper end of plates 101, receives a clockwise push serving to move catch roller 102 outwardly over the edge of lip 104. Clockwise rotation of trip shaft 109 further serves to rotate a clutch retainer toggle 118. Toggle 118 is fixed to the near end of trip shaft 109 as shown in FIGURE 5.

As toggle 118 moves clockwise it serves to release a single revolution clutch 119 whereby a single revolution of shaft 117 is developed. Clutch 116 is of conventional design, for example, as manufactured by the New Holland Machine Co. Division, Sperry Rand Corporation of New York city and sold as their Part Nos. 27326 and 17527. Any suitable single revolution clutch means can be provided, however, which is capable of being actuated by means responsive to the movement of trip roller 78.

Figure 2:
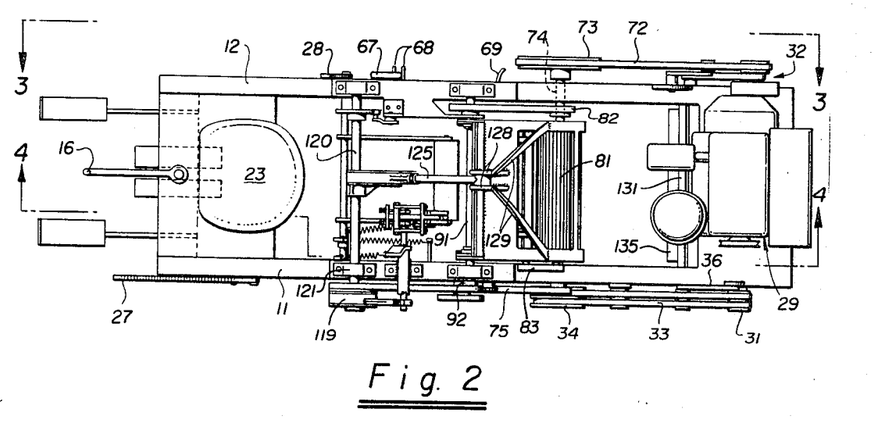
FIGURE 2 is a plan view of FIGURE 1.

Single revolution shaft 120 is journaled upon the side plates 99 between journal bearings 121, 122. Shaft 120 drives an eccentric 124 through one revolution to reciprocate connecting rod 125 (as shown in FIGURES 2 and 4). A detent cam 126 and a spring loaded cam follower 127 serve to define the end of each revolution of shaft 120 and hold it in place. Cam 126 is fixed to shaft 120 and is therefore firmly engaged at the end of each revolution. Spring 106 serves to urge toggle 118 counterclockwise whereby, as the release trigger 123 is returned upwardly at the end of a single revolution, toggle 118 will engage same and end the cycle.

Connecting rod 125 is arranged, as described above, for movement between retracted and advanced positions.

The outer end of rod 125 is coupled to a pin to an upwardly extending brace 128. Brace 128 is reinforced by struts 129. Reciprocating movement of connecting rod 125 serves to rock the subframe formed by J members 88 about axle 91, the ends of J members 88 being journaled upon same.

Thus, each downward movement of trip roller 78 of an extent as occasioned when rolling off the trailing edge of a slab of sod serves to dislodge toggle 118 to cause single revolution clutch 119 to rotate shaft 120 a single revolution. Rotation of shaft 120 serves to reciprocate connecting rod 125 between advanced and retracted positions and return, thereby causing deflector member 90 to urge a completed roll of sod rearwardly from the roll-forming station.

Having prepared a completed roll of sod, it is subsequently delivered from the apparatus to the ground as the vehicle continues to move across the field. A yielding back-stop means is disposed in the path of each roll of sod being delivered thereby yieldingly absorbing any resultant rearward relative movement caused by the rearward boost imparted to the roll by deflector 90. Rearward relative movement of each roll of sod with respect to the ground is precluded upon striking the ground in order to prevent unrolling of the roll.

In delivering each roll, it will be evident that the movement of the vehicle imparts a forward component to the relative movement of each roll delivered to the ground. It will also be evident that the deflector 90 serves to boost each roll rearwardly from the rolling station and that this rearward boost must be done quickly to accommodate the next arriving slab of sod at the rolling station. Thus, a rearward component of relative movement is imparted to each roll by deflector 90. The faster the movement of the vehicle becomes, the quicker the deflector 90 must act. Therefore, both the rearward component and the forward component of relative movement with respect to the ground are related.

As previously noted the conveyor is driven at a speed whereby each slab of sod becomes separated from the following slab. The greater the gap between successive slabs becomes, the slower the deflector 90 can act in boosting each roll of sod from the rolling station. However, it has been observed to be desirable not to demand excessive conveyor speed for this purpose since the yielding backstop means now to be described serves to insure against rearward unrolling of the sod rolls immediately after they strike the ground.

This unrolling of the sod, of course, is occasioned by the fact that any net rearward velocity of the sod after it engages the ground will rotate the roll of sod in a direction having the same "hand" as the helix of the roll, where the "hand" of the helix is identified by tracing from the innermost to the outermost convolution.

Figure 11:
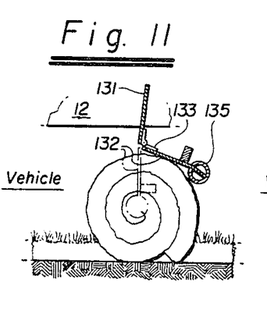
FIGURE 11 shows a roll of sod lying in proper position on the ground.
Figure 12:
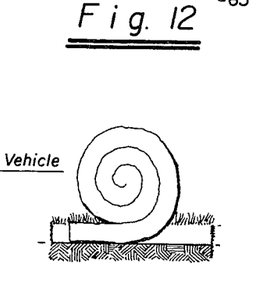
FIGURE 12 shows a roll of sod lying in an improper position on the ground.

As shown in FIGURES 11 and 12, the sod roll is delivered to the ground formed with a helix wound in a predetermined "hand" which is opposite to the "hand" of the direction of rotation of the wheels of the vehicle. Accordingly, by rolling the sod roll in the direction of forward movement of the vehicle the helix of the sod roll will have a tendency to be tightened. If the forward movement of the sod roll ultimately terminates with the sod roll in a position as shown in FIGURE 12 it will be noted that the center of gravity of the roll will be slightly displaced to the right of the axis through the center of the roll. This slight displacement of the center of gravity, taken together with the natural resiliency of the sod tending to uncoil the roll will start the roll to unravel and such unraveling will continue until it is complete.

On the other hand, if the roll of sod terminates its forward movement in a position as shown in FIGURE 11, the trailing edge of the sod serves to act as a brake against uncoiling of the roll whereby it will remain tightly wrapped until removed from the field.

The apparatus disclosed herein serves to deliver each roll of sod to the ground whereby it will come to rest in a position as shown in FIGURE 11.

Before describing the means for achieving the foregoing objective it should be noted that the rearward boosting action of deflector 90 is initiated by the downward movement of trip roller 78. Thus, the rearward boosting action will always commence at a predetermined point in the rotational orientation of the roll within the roll forming station regardless of the length of the slab of sod, for the reason that trip roller 78 moves downwardly to tripping position only as the trailing edge of each slab passes out from underneath. Accordingly the final delivered position of a roll of sod has been observed to be a function of the rotational positioning of the trailing edge of the roll of sod when in the roll forming station. This rotational positioning can be controlled by dimensioning the spacing between trip roller 78 and curling roller 81 and also by adjusting the conveyor speed.

The yielding backstop means for absorbing any resultant rearward relative movement of a roll of sod with respect to the ground is disposed to the rear of the roll forming station and below the frame of the vehicle. A fixed leaf is secured at each end, as by welding, to side frame members 11, 12 and disposed to extend transversely therebetween. At the bottom edge of leaf 131 another leaf 132 is supported on hinges 133 to hang freely downwardly beneath the vehicle. Leaf 132 is free to swing arcuately to the rear to permit each roll of sod to pass beneath.

Leaf 132 is provided with a transversely extending inertia bar 134 of a heavy material, such as lead. The lower edge of leaf 132 is given rigidity and protected against damage, as by bending, by securing a transversely extending pipe 135 to it to form a rounded lower edge.

Inertia bar 134 and pipe 135 impart sufficient inertia to leaf 132 whereby any net rearward velocity of a roll of sod being delivered to the ground will be arrested so as to maintain the integrity of the roll and nullify any unwinding effect. The weight of inertia bar 134 is selected whereby each roll of sod comes to rest with the center of gravity of the roll disposed between the trailing edge of the roll and the center of the roll.

In operation, it will be readily apparent that as tines 41 move beneath a predetermined thickness of sod, a length of sod will be directed by the vehicle movement upwardly onto the upper run of a conveyor. The length of sod will initially move trip roller 78 upwardly thereby causing catch roller 102 to ride up over tooth 104 of cam member 105. Cam member 105 is held in its counterclockwise limiting position by means of spring 106. The leading edge of the sod will initially be pressed against the upper run of endless belt conveyor 45 by the weight of trip roller 78. The restraining rollers 79 will next engage sod 39 raising lever arms 85 and tuck roller 80 followed by engagement with curling roller 81.

Curling roller 81, rotating against the direction of movement of sod 39, turns the leading edge of sod 39 back upon itself so that tuck roller 80 can direct the leading edge to initiate the first convolution of a roll.

As the roll of sod progressively increases, the region of applied pressure (as applied by roller 80) expands to include pressure contact applied by rollers 79. As the roll of sod continues to grow, it contacts the resilient leaf mounted deflector member 90.

Ultimately, the trailing edge of sod 39 passes beneath trip roller 78 causing connecting rod 100 to move downwardly. As the full weight of trip roller 78 is applied, via catch roller 102, to tooth 104, catch roller 102 falls downwardly and is pushed forwardly off tooth 104 due to the action of link 115. Downward movement of cam member 105 serves to rock toggle 118 forwardly causing it to release trigger 123 initiating a rotation of the single revolution clutch 119.

Clutch 119 rotates shaft 120 whereby the reciprocable connecting rod 125 operates through one cycle of reciprocation. Thus, as rod 125 moves rearwardly the subframe formed by J members 88 rocks counter-clockwise as shown in FIGURE 4 whereby deflector member 90 serves to boost a roll of sod from the roll forming station.

Figures 8, 8A:
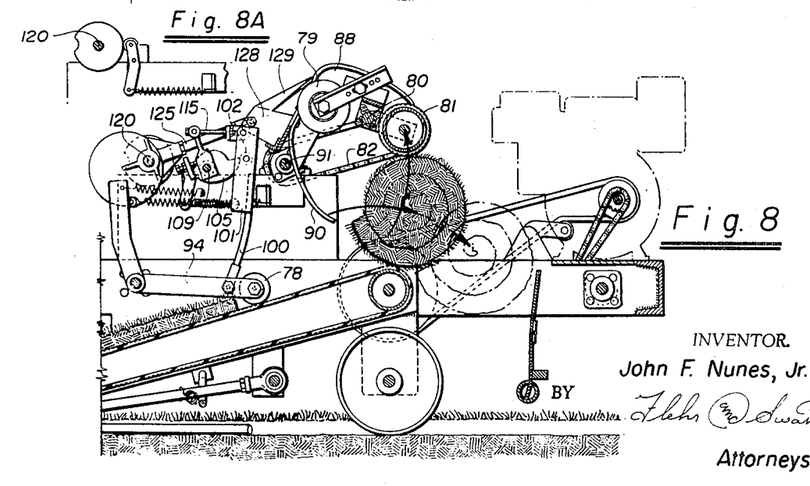
FIGURE 8A is a detail view of that portion of the apparatus according to FIGURE 7A showing its temporal condition corresponding to the condition of operation in FIGURE 8.

As shown in FIGURE 8 it will be apparent that during the delivery of a roll of sod, rolled in a counterclockwise direction, the sod is urged out of the roll forming station by the downward movement of rollers 79, 80 as well as by the boosting movement of member 90.

The roll of sod drops to the ground and whatever momentum it may have developed by a net rearward movement relative to the ground is absorbed by the inertia of hinged leaf 132.

From the foregoing it will be readily evident that there is provided an improved sod harvesting apparatus wherein a tight roll of sod is achieved and delivered to the ground in a manner maintaining the integrity of the roll.

I claim:

1. A mobile sod harvesting apparatus comprising a frame, wheels supporting the frame to move same across a field of sod to be harvested, means carried by the frame to engage sod lying on the ground and convey same to a roll forming station, roll forming means at said station serving to curl a predetermined length of sod tightly into a roll, means serving to detect substantial completion of the roll, means responsive to the last named means for advancing said roll from said station to deliver same from the apparatus, and means serving to substantially arrest any rearward relative movement of the roll relative to the ground upon its delivery to the ground which otherwise would tend to unroll the sod.

2. In a mobile sod harvesting apparatus having a frame adapted to move across a field of sod being harvested, means serving to engage and remove the sod from the ground to a sod rolling station above the ground for forming the sod into a roll thereof, means at said station serving to form the sod into a roll thereof, means serving to deliver the roll to the ground, and means carried by said frame and serving to substantially arrest any rearward relative movement of the roll relative to the ground upon its delivery to the ground which otherwise would tend to unroll the sod.

3. A mobile sod harvesting apparatus comprising a wheel supported frame adapted to move across a field of sod to be harvested, endless conveyor means having upper and lower reaches thereof, said upper reach being disposed to support and carry a length of sod to a roll forming station, roll forming means at said station serving to roll said length of sod into a roll thereof of predetermined hand defined by tracing from the innermost to the outermost convolution, said hand being opposite to the hand of the direction of rotation of the wheels of the vehicle, and means serving to deliver said roll upon completion thereof to come to rest on the ground with the center of gravity of the roll disposed between the axis of the roll and the trailing edge of the sod of said roll to maintain the integrity of said roll.

4. Mobile sod harvesting apparatus according to claim 1 wherein the last named means comprises a yielding backstop means depending downwardly below the frame in the path of each roll of sod delivered and supported to absorb any resultant rearward relative movement of said roll discharging from said station.

5. Mobile sod harvesting apparatus according to claim 4 wherein the last named means comprises a leaf member pivoted to swing freely about a hinge axis transversely of the path of each delivered roll, and inertia means carried by said leaf member to provide sufficient inertia to said leaf member to arrest rearward movement of the roll relative to the ground.

6. A mobile sod harvesting apparatus comprising a frame, wheels supporting the frame to move the same across a field of sod to be harvested, means carried by the frame to engage the sod and convey same to a roll forming station, roll forming means at said station serving to curl a predetermined length of sod tightly into a roll, said roll forming means engaging the sod and curling same to initiate formation of the roll, said roll forming means further serving to apply, to the roll being formed, a restraint acting against expansion thereof, said restraint being applied over a progressively increasing arcuate extent of the periphery of the roll, means serving to detect substantial completion of the roll, and means responsive to the last named means for advancing said roll from said station to deliver same from the apparatus, said roll forming means including a plurality of transversely extending pressure rollers spaced along and above the conveyor means, said rollers being disposed to yieldingly engage sod on the conveyor means, a sod curling roller extending transversely of the conveyor means, means driving said curling roller to rotate same against the direction of movement of sod on said conveyor means and into engagement with the sod thereon to curl same backwardly to form a roll thereof, said curling roller being disposed to feed the sod against one of the pressure rollers to direct the leading edge of the sod backwardly against the foliage side of the sod, another of the pressure rollers being disposed to engage the dirt side of the sod at a point arcuately spaced from the point of contact of said one of the pressure rollers with the sod, both said pressure rollers being yieldingly supported to move with outward expansion of the roll being formed.

7. Sod harvesting apparatus according to claim 6 further including means disposed ahead of the curling roller to engage the dirt side of the rolled sod at a region further arcuately spaced from the foregoing points of contact to resist expansion of the roll during the latter stages of forming same, the last named means being movable between retracted and advanced positions and responsive to said means detecting completion of the roll to discharge said roll from said station.

8. In sod harvesting apparatus having means for handling sod to be rolled, endless conveyor means for conveying sod to a roll forming station, roll forming means at said station comprising a sod curling roller extending transversely of the conveyor means, means rotating the curling roller against the direction of sod movement and into engagement with the leading edge of the sod to double back the sod upon itself, pressure applying means disposed to yieldingly bear upon the outer periphery of the roll being formed and to engage same over a progressively increasing arcuate extent thereof, and means serving to deliver a completed roll from said station, said delivery means moving between retracted and advanced positions, said delivery means when in said retracted position serving to yieldingly bear against the roll being formed, and when moved to said advanced position serving to advance a completed roll from said station, and means for detecting completion of a roll, said delivery means being operably responsive to the detecting means to move to its advanced position to deliver said roll from said station.

9. A mobile sod harvesting apparatus comprising a frame, means supporting the frame to move same across a field of sod to be harvested, means carried by the frame to engage the sod and convey same to a roll forming station, the last named means including an endless belt having an upper reach traveling upwardly and rearwardly and a return reach moving downwardly and forwardly of the apparatus, the upper reach being disposed to receive sod thereon and convey same to said roll forming station, roll forming means at said station serving to engage the sod and curl a predetermined length thereof into a roll, means coacting with said upper reach disposed with respect to said roll forming means to detect substantial completion of the roll, and means responsive to completion of the roll to advance the roll from said station for delivery thereof, means defining an inclined ramp disposed ahead of the endless belt to pass beneath the sod and direct the same onto the upper reach, and means supporting said ramp to permit the leading edge to rise and fall and to tilt with terrain following movement in an upright plane, said plane extending transversely to the direction of vehicle movement.

10. A mobile sod harvesting apparatus comprising a frame, means supporting the frame to move same across a field of sod to be harvested, means carried by the frame to engage the sod and convey same to a roll forming station, the last named means including an endless belt having an upper reach traveling upwardly and rearwardly and a return reach moving downwardly and forwardly of the apparatus, the upper reach being disposed to receive sod thereon and convey same to said roll forming station, roll forming means at said station serving to engage the sod and curl a predetermined length thereof into a roll, means coacting with said upper reach disposed with respect to said roll forming means to detect substantial completion of the roll, and means responsive to completion of the roll to advance the roll from said station for delivery thereof, a ramp assembly including means defining a ramp disposed ahead of the endless belt to direct sod onto same, and means supporting said ramp comprising a first elongate member extending transversely of the frame and mounted to revolve about an axis spaced from and parallel to its own axis, means to revolve said first elongate member during movement of the frame across a field, a second and third elongate member extending forwardly from opposite ends of said first member, means coupling second and third members to said ends respectively and permitting each to move with universal movement thereat, means supporting said ramp means between the other ends of said second and third members and permitting said ramp means to articulate with a universal movement at each of said other ends with respect to said second and third members.

11. A mobile sod harvesting apparatus comprising a frame, means supporting the frame to move same across a field of sod to be harvested, means carried by the frame to engage the sod and convey same to a roll forming station, the last named means including an endless belt having an upper reach traveling upwardly and rearwardly and a return reach moving downwardly and forwardly of the apparatus, the upper reach being disposed to receive sod thereon and convey same to said roll forming station, roll forming means at said station serving to engage the sod and curl a predetermined length thereof into a roll, means coacting with said upper reach disposed with respect to said roll forming means to detect substantial completion of the roll, and means responsive to completion of the roll to advance the roll from said station for delivery thereof, a ramp assembly including means defining a ramp disposed ahead of the endless belt to direct sod onto same, and means supporting the ramp comprising a plurality of members defining a quadrilateral carriage, one side of said quadrilateral being mounted to revolve in an annular path about an axis spaced from its own axis, means coupling each adjacent pair of the four sides of the quadrilateral for universal movement therebetween, the side of said quadrilateral opposite said one side including said ramp means, and means serving to revolve said one side.

12. In a mobile sod harvesting apparatus comprising a frame, means supporting the frame to move same across a field of sod to be harvested, means carried by the frame to convey same from the ground, the last named means including an endless belt having an upper reach traveling upwardly and rearwardly and a return reach moving downwardly and forwardly of the apparatus, the upper reach being disposed to receive sod thereon and convey same upwardly, means serving to move said upper reach to apply a pull to sod entering upon said upper reach, means defining an inclined ramp riding freely on the earth for terrain following movements and having a leading edge disposed ahead of the endless belt to pass beneath the sod to wedge the same upwardly onto the upper reach, and means independently driven as the frame moves across a field serving to positively move the leading edge of said ramp means for repetitive advancing and retreating movements beneath sod to be harvested, and means supporting said ramp to permit the leading edge to rise and fall and to tilt with terrain following movement in an upright plane, said plane extending transversely to the direction of vehicle movement.

13. In a mobile sod harvesting apparatus comprising a frame, means supporting the frame to move same across a field of sod to be harvested, means carried by the frame to convey same from the ground, the last named means including an endless belt having an upper reach traveling upwardly and rearwardly and a return reach moving downwardly and forwardly of the apparatus, the upper reach being disposed to receive sod thereon and convey same upwardly, means defining an inclined ramp disposed ahead of the endless belt to pass beneath the sod and direct the same onto the upper reach, means supporting said ramp to permit the leading edge to rise and fall and to tilt with terrain following movement in an upright plane, said plane extending transversely to the direction of vehicle movement, and means serving to define the upper and lower limits of the rise and fall of said ramp means to preclude upward excursions of the ramp means which would slice through sod being picked up, and to inhibit downward excursions tending to dig at a progressively steepening downward angle into the ground.

14. Sod harvesting apparatus according to claim 9 further including means serving to define the upper and lower limits of the rise and fall of said ramp means to preclude upward excursions of the ramp means which would slice through sod being picked up, and to inhibit downward excursions tending to dig at a progressively steepening downward angle into the ground.

15. Sod harvesting apparatus according to claim 9 further including means serving to positively move the leading edge of said ramp means to advance and retreat beneath sod to be harvested as the frame moves across a field.

16. Sod harvesting apparatus according to claim 9 further including means to support the leading edge of said ramp means free to swing laterally of the path of sod being harvested, means forming a registration surface serving to cooperate with the exposed edge of a line of sod adjacent the line of sod being harvested and to guide the lateral movements of said ramp means thereby, and resilient means serving to urge said registration surface into engagement with said exposed edge of sod.

17. In sod harvesting apparatus having means for handling sod to be rolled, endless conveyor means conveying sod to a roll forming station, roll forming means at said station comprising a sod curling roller extending transversely of the conveyor means, a pressure roller disposed on an axis transversely of the path of said sod and above the conveyor means, means rotating the curling roller against the direction of sod movement and into engagement with the leading edge of the sod to double back the sod upon itself, said pressure roller being supported to engage and rest upon the dirt side of a roll of sod being formed and to yieldingly move with outward expansion of the roll during formation thereof, means for detecting the substantial completion of a roll of sod, and means movable between forward and rearward positions to boost the roll of sod from said station, said pressure roll being free to fall and maintain contact with the dirt side of the roll during rearward movement of the last named means and cooperate therewith in boosting said roll of sod from said station.

References Cited

UNITED STATES PATENTS

| | | | |
|---|---|---|---|
| 2,345,425 | 3/1944 | Phillips | 172—20 |
| 3,235,011 | 2/1966 | Pasinski et al. | 172—19 |
| 2,617,347 | 11/1952 | Provost | 172—20 |
| 2,756,661 | 7/1956 | Frisbie et al. | 172—20 |
| 2,761,366 | 9/1956 | Jones | 172—118 X |
| 2,778,292 | 1/1957 | Kavan | 172—20 |
| 2,928,479 | 3/1960 | Petersen | 172—118 X |
| 3,164,211 | 1/1965 | Scott | 172—19 |

ABRAHAM G. STONE, *Primary Examiner.*

J. R. OAKS, *Assistant Examiner.*